(12) United States Patent
Zhang et al.

(10) Patent No.: US 12,303,857 B2
(45) Date of Patent: May 20, 2025

(54) LOW-TEMPERATURE PLASMA REGENERATION SYSTEM AND METHOD FOR INACTIVATED ACTIVATED CARBON

(71) Applicant: SOUTHEAST UNIVERSITY, Nanjing (CN)

(72) Inventors: Huiyan Zhang, Nanjing (CN); Jiawei Wang, Nanjing (CN); Rui Xiao, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 289 days.

(21) Appl. No.: 17/642,670

(22) PCT Filed: Dec. 22, 2020

(86) PCT No.: PCT/CN2020/138202
§ 371 (c)(1),
(2) Date: Mar. 11, 2022

(87) PCT Pub. No.: WO2021/258684
PCT Pub. Date: Dec. 30, 2021

(65) Prior Publication Data
US 2023/0105763 A1   Apr. 6, 2023

(30) Foreign Application Priority Data

Jun. 24, 2020 (CN) .......................... 202010583594.9

(51) Int. Cl.
| | | |
|---|---|---|
| *B01J 19/08* | (2006.01) | |
| *B01D 53/14* | (2006.01) | |
| *B01J 20/20* | (2006.01) | |
| *B01J 20/34* | (2006.01) | |

(52) U.S. Cl.
CPC ........ *B01J 19/088* (2013.01); *B01D 53/1493* (2013.01); *B01J 20/20* (2013.01); *B01J 20/3416* (2013.01); *B01J 20/3441* (2013.01); *B01D 2252/10* (2013.01); *B01J 2219/0809* (2013.01); *B01J 2219/0869* (2013.01); *B01J 2219/0879* (2013.01); *B01J 2219/0896* (2013.01)

(58) Field of Classification Search
CPC ...... B01J 19/088; B01J 20/20; B01J 20/3416; B01J 20/3441; B01D 53/1493
See application file for complete search history.

(56) References Cited

FOREIGN PATENT DOCUMENTS

| CN | 1899685 A | * | 1/2007 |
|---|---|---|---|
| CN | 104772005 A | * | 7/2015 |

OTHER PUBLICATIONS

Galvez et al., Phys. Chem. Chem Phys, (2016), v18, p. 7651-7660.*

* cited by examiner

Primary Examiner — Yong L Chu
(74) Attorney, Agent, or Firm — JCIPRNET

(57) ABSTRACT

A low-temperature plasma regeneration system and a low-temperature plasma regeneration method is for inactivated activated carbon, wherein the system comprises a gas supply system, a plasma reaction apparatus and a waste gas treatment apparatus, wherein the gas supply system is configured for supplying gas and water vapor; the plasma reaction apparatus comprises a top electrode, a grounded lower electrode, a regeneration reactor arranged between the electrodes, and a high-voltage alternating current power supply connected with the top electrode; a stirrer is arranged in the regeneration reactor, a gas inlet is arranged at the center position of the top of the reactor, and gas outlets are arranged around the reactor. The system of the present invention has a simple and compact structure, a convenient operation and a function of reaction-and-premix integration.

10 Claims, 2 Drawing Sheets

LOW-TEMPERATURE PLASMA REGENERATION SYSTEM AND METHOD FOR INACTIVATED ACTIVATED CARBON

TECHNICAL FIELD

The present invention relates to a regeneration system and a regeneration method, in particular to a low-temperature plasma regeneration system and a low-temperature plasma regeneration method for inactivated activated carbon.

BACKGROUND

Activated carbon has huge specific surface area and rich pore structures, which is an excellent adsorbent and generally prepared by a physical or chemical activation method. It is complex in preparation process and highly expensive. The price of activated carbon with an iodine value of 1000 is as high as 10,000-12,000 yuan/ton, thus it is of high economic value for repeated regeneration of inactivated activated carbon.

Commonly used regeneration methods for activated carbon include thermal regeneration, ultrasonic regeneration, electrochemical regeneration, biological regeneration, wet oxidation regeneration, and low-temperature plasma regeneration. The thermal regeneration method is currently the most widely used and the most mature method. It desorbs adsorbates from adsorbents by increasing temperature, which usually consumes a large amount of energy, and the desorbed adsorbates also cause secondary pollution. The low-temperature plasma generated by oxygen discharge contains a large amount of oxygen active substances, free radicals and ozone, and these strong-oxidizing substances can decompose organic adsorbates adsorbed on the surface of the activated carbon, thereby achieve the purpose of regeneration. At present, the low-temperature plasma regeneration technology has been developed to a certain extent, but still has many problems in the aspects of equipment and process methods, such as low plasma regeneration efficiency and pollution of chemical reagents.

SUMMARY

Objective: The present invention aims to provide a low-temperature plasma regeneration system and a low-temperature plasma regeneration method for inactivated activated carbon that are high-efficiency and environment-friendly so as to solve the above problems.

Technical scheme: The low-temperature plasma regeneration system for inactivated activated carbon of the present invention comprises a gas supply system, a plasma reaction apparatus and a waste gas treatment apparatus, wherein the gas supply system is configured for supplying gas and water vapor; the plasma reaction apparatus comprises a top electrode, a grounded lower electrode, a regeneration reactor arranged between the electrodes, and a high-voltage alternating current power supply connected with the top electrode; a stirrer is arranged in the regeneration reactor, a gas inlet is arranged at the center position of the top of the reactor, and gas outlets are arranged around the reactor.

The low-temperature plasma regeneration method for inactivated activated carbon of the present invention based on the regeneration apparatus comprises:

(1) putting inactivated activated carbon into the regeneration reactor, putting the reactor between the top electrode and the lower electrode of the plasma reaction apparatus, and adjusting the top electrode and the lower electrode and sealing the reactor;

(2) opening the gas supply system to introduce an inert gas, turning on the high-voltage alternating current power supply to adjust peak voltage and frequency, then observing a stable and continuous Lissajous figure displayed on a display screen of the digital storage oscilloscope, and maintaining the reaction for a certain time;

(3) opening the water vapor generator and the gas supply system to introduce water vapor, oxygen and an inert gas, fully mixing the gas in a gas mixer, then introducing the gas into the regeneration reactor to participate in an oxidation reaction, adjusting the peak voltage and frequency of the power supply, and keeping the reaction state unchanged;

(4) turning off the high-voltage alternating current power supply to suspend the reaction, turning on a motor to drive the stirrer to rotate the mixed materials, and re-exciting plasma after bottom-layer activated carbon is exposed on a surface to perform the oxidation reaction; and (5) taking out activated carbon and drying to obtain the regenerated activated carbon after cooling the reactor to room temperature.

Beneficial effects: The present invention has the following remarkable advantages compared with the prior art.

The system of the present invention has a simple and compact structure, a convenient operation and a function of reaction-and-premix integration, thereby saving a large amount of labor cost; the present invention adopts a dry physical method to regenerate the activated carbon, and has the advantages of low energy consumption and no pollutants generated, which is more conductive to energy conservation and environmental protection; the present invention adopts water vapor-oxygen-helium mixed plasma regeneration, and has stronger oxidation effect and higher regeneration efficiency, which brings better effect; the present invention adopts multiple premix regenerations, so that the total area directly irradiated by plasma is larger in a limited space, thereby improving energy utilization rate and fully generating activated carbon; and in the present invention, the regeneration rate of the regenerated activated carbon is as high as 95.1% while the carbon loss rate is only 1.1%, and the regeneration rate is still as high as 92.01% after regeneration is repeated for 10 times.

DETAILED DESCRIPTION

The technical scheme of the present invention is further described below with reference to the drawings.

Figure 1:
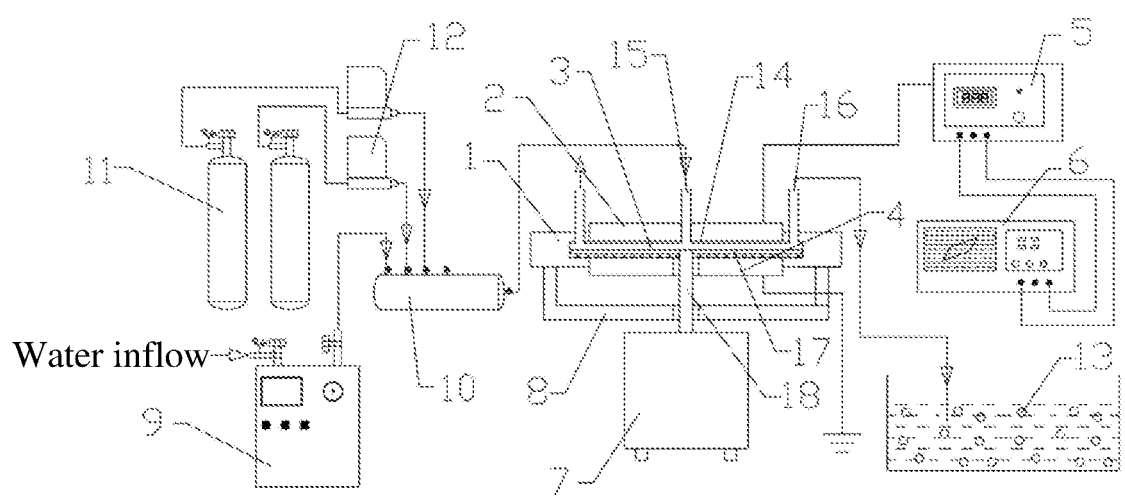
FIG. 1 is a schematic diagram of the system of the present invention.
Figure 2:
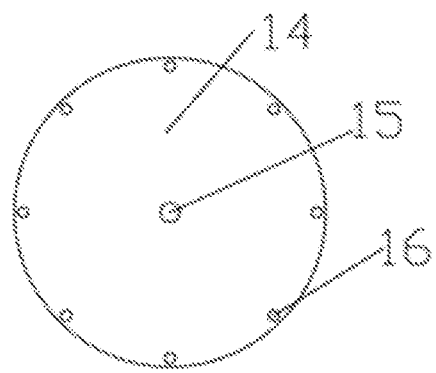
FIG. 2 is a top view of an upper cover of a disc reactor.

As shown in FIG. 1, the system of the present invention comprises a gas supply system for supplying gas and water vapor, a plasma reaction apparatus 1, and a waste gas treatment apparatus 13.

The gas supply system comprises: a water vapor generator 9, a gas source 11, a gas flowmeter 12 and a gas mixer 10. The gas source 11 and the water vapor generator 9 are connected with the gas mixer 10 through a pipeline, and the gas flowmeter 12 is arranged on a gas outlet pipeline of the gas source 11. Gas connection ports are evenly arranged on the gas mixer 10. The temperature of vapor at the outlet of the water vapor generator 9 is 100-170° C., the gas mixer 10 is made of stainless steel, the size of the gas mixer can ensure the full mixing of the gases, 3-5 gas connection ports are evenly arranged at the upper and rear of the gas mixer, and gas pipes are made of stainless steel. The water vapor generator 9 is connected with the gas mixer 10 through a vapor pipeline and the gas mixer 10 is connected with the regeneration reactor 3 through a vapor pipeline, the vapor pipelines should not be set too long, and the outside of the gas mixer 10 and the outside of the water vapor pipeline are laid with thermal insulation materials made of asbestos, stone wool, glass wool, and the like, and having a thickness ensuring that water vapor is not condensed in the pipelines and apparatus.

The plasma reaction apparatus 1 comprises: a regeneration reactor 3, a top electrode 2, a grounded lower electrode 4, a high-voltage alternating current power supply 5 and a digital storage oscilloscope 6. The regeneration reactor 3 has a structure with a bottom and a cover, a gas inlet 15 is arranged in the center of an upper cover plate 14, the gas inlet is connected with an outlet of the gas mixer 10 through a pipeline, a plurality of gas outlets 16 are evenly arranged radially around the regeneration reactor, the reaction gas passes through the center of the electrode and enters vertically from the gas inlet 15, and spreads evenly around the entire reaction chamber, the exhaust gas is discharged from the surrounding gas outlets 16 and absorbed in the waste gas treatment apparatus 13. The top electrode 2 and the lower electrode 4 are metal electrodes embedded into the regeneration reactor 3, the top electrode 2 has a receding hole at the gas inlet, and the lower electrode 4 has a receding hole at a transmission shaft 18. Both the upper and lower electrodes are provided with a height adjusting apparatus, by which the position can be adjusted up and down to clamp the regeneration reactor 3. The regeneration reactor 3 has a structure with a bottom and a cover made of high-purity quartz or corundum, and the thickness of upper and lower bottom plates thereof should not be too thick and the gas gap should not be too large to ensure that the gas can be normally broken down to generate plasma.

A kick-out apparatus 17 is arranged in the regeneration reactor 3, the stirrer 17 is connected with a power motor 7 arranged below the plasma reaction apparatus 1, and the stirrer is connected with the motor 7 through the transmission shaft 18 and rotates under the driving of the motor 7. The stirrer 17 has a structure with a shape of a single row of rake and evenly distributed rake teeth, and at least two stirrers 17 are provided and made of tetrafluoroethylene. When two stirrers are provided, the two stirrers are arranged on a central axis of the regeneration reactor 3, the rotation directions are opposite, and the planar material mixing of the whole reactor is realized. A supporting tray 8 is arranged below a shell of the plasma reaction apparatus 1 for supporting the plasma reaction apparatus 1.

The top electrode 2 is connected with the high-voltage alternating current power supply 5, and the high-voltage alternating current power supply 5 is connected with the digital storage oscilloscope 6. The peak voltage of the high-voltage alternating current power supply 5 can be adjusted within a range of 0-100 kV, and the frequency thereof can be adjusted within a range of 0-100 kHz. Probes of the digital storage oscilloscope 6 are connected with a power supply high-voltage output voltage interface and a power supply high-voltage output current interface, respectively, current value and voltage value of the regeneration reactor 3 are measured, and discharge power is calculated by using a Lissajous figure.

An absorption liquid in the waste gas treatment apparatus 13 is a 5-10% potassium iodide solution mainly absorbing residual ozone.

The working process of the present invention specifically comprises:
(1) putting inactivated activated carbon into the regeneration reactor, putting the reactor between the top electrode and the lower electrode of the plasma reaction apparatus, and adjusting the top electrode and the lower electrode and sealing the reactor; wherein the adsorbates on the surface of inactivated activated carbon are organic pollutants, and the thickness of activated carbon material layer is 1-10 mm;
(2) opening the gas supply system to introduce an inert gas, turning on the high-voltage alternating current power supply to adjust peak voltage and frequency, then observing a stable and continuous Lissajous figure displayed on a display screen of the digital storage oscilloscope, and maintaining the reaction for a certain time; wherein the activation gas is an inert gas such as helium or argon, and the mixed gas is selected from oxygen and helium, and oxygen and argon, preferably oxygen and helium; the gas stays in the reactor for 5-7 s, activation time is 1-2 min, peak voltage ranges from 30 kV to 100 kV, frequency is 5-40 kHz, and preferably, the activation time is 1 min, the peak voltage is 30 kV, and the frequency is 10 kHz;
(3) opening the water vapor generator and the gas supply system to introduce water vapor, oxygen and an inert gas, fully mixing the gas in the gas mixer, then introducing the gas into the regeneration reactor to participate in an oxidation reaction, adjusting the peak voltage and frequency, and keeping the reaction state unchanged; wherein the amount of water vapor accounts for 1-10% of the mass of the activated carbon, preferably 1%; the mixed gas stays in the reactor for 1-12 s, the oxygen content in the mixed gas is 5-50%, the peak voltage ranges from 30 kV to 100 kV, and the frequency is 5-40 kHz;
(4) turning off the high-voltage alternating current power supply to suspend the reaction, turning on the motor to drive the stirrer to rotate the mixed materials, and re-exciting plasma after bottom-layer activated carbon is exposed on a surface to perform the oxidation reaction; wherein the stirrer rotates and mixes for 30-60 s, which matches the thickness of the material layer, and preferably, the mixing time is 30 s, and the thickness of the material layer is 3 mm; the regeneration time is 30-90 min, and the mixing times are 2-4 times;
(5) taking out activated carbon and drying after cooling the reactor to room temperature, and obtaining the regenerated activated carbon after drying at the temperature of 100-105° C. for 8-10 hrs.

The following examples are all carried out in a quartz reactor having a diameter of 90 mm. The adsorbates selected are aniline at an initial concentration of 300 mg/L. Calculation of regeneration rate: the ratio of the regenerated saturated adsorption capacity to the original saturated adsorption capacity is obtained by controlling the same adsorption conditions as the preparation of the inactivated activated carbon, including initial adsorption concentration, activated carbon dosage, volume of mixed solution, temperature, pH value, adsorption time and the like, and the calculation formula is as follow:

$$RE = q_i/q_0 \times 100\%$$

RE is regeneration rate %, $q_i$ is the regenerated saturated adsorption capacity (mg/g), and $q_0$ is initial saturated adsorption capacity (mg/g).

Example 1

(1) 1 g of inactivated activated carbon was taken and spread evenly on the bottom plate of a quartz reactor, and the thickness of the material was about 3 mm;
(2) helium was introduced at a flow rate of 50 mL/min, the high-voltage alternating current power supply was turned on to control the discharge voltage to be 30 kV and the discharge frequency to be 10 kHz, and the reaction was performed for 1 min to complete the surface activation of the activated carbon;
(3) the water vapor generator was opened to generate vapor, the water consumption/activated carbon was 0.1, oxygen and helium were introduced in a ratio of 3:7, the flow rate of the mixed gas was 100 mL/min, the high-voltage alternating current power supply controls the discharge voltage to be 40 kV and the discharge frequency to be 10 kHz, data were stored, and the power calculated by the Lissajous figure was 70 W;
(4) after 30 min of reaction, the supply power was turned off to suspend the reaction, the power motor was turned on to drive the rake-type stirrer to rotate, and the material were mixed for 30 s, plasma was re-excited after bottom-layer activated carbon was exposed on the surface, the parameters were kept unchanged, and the previous operation was repeated after 30 min;
(5) after the reaction was completed, the regenerated activated carbon was taken out and dried at 105° C. for 24 hrs; and
(6) the regeneration adsorption process was carried out, and the regeneration rate was calculated to be 81.3%.

Example 2

The difference between Example 2 and Example 1 is that the flow rate of the mixed gas is 50 mL/min, the discharge voltage is 50 kV, the processing time is 20 min once, the input power is 98 W, and the regeneration rate is calculated to be 88.2% in the step (3).

Example 3

The difference between Example 3 and Example 1 is that the discharge voltage is 50 kV, the input power is 98 W, the processing time is 20 min once, and the regeneration rate is calculated to be 95.11% in the step (3).

Example 4

The difference between Example 4 and Example 1 is that the oxygen and helium are introduced in a ratio of 2:8, the discharge voltage is 50 kV, the input power is 98 W, the processing time is 20 min once, and the regeneration rate is calculated to be 88.1% in the step (3).

Example 5

The difference between Example 5 and Example 1 is that the oxygen and helium are introduced in a ratio of 2:8, the discharge voltage is 60 kV, the input power is 112 W, the processing time is 20 min once, and the regeneration rate is calculated to be 91.83% in the step (3).

Example 6

The difference between Example 6 and Example 1 is that the oxygen and helium are introduced in a ratio of 2:8, the discharge voltage is 70 kV, the input power is 126 W, the processing time is 20 min once, and the regeneration rate is calculated to be 94.89% in the step (3).

Example 7

The difference between Example 7 and Example 1 is that the oxygen and helium are introduced in a ratio of 2:8, the discharge voltage is 70 kV, the input power is 98 W, the processing time is 10 min once, and the regeneration rate is calculated to be 92.48% in the step (3).

Example 8

Figure 3:
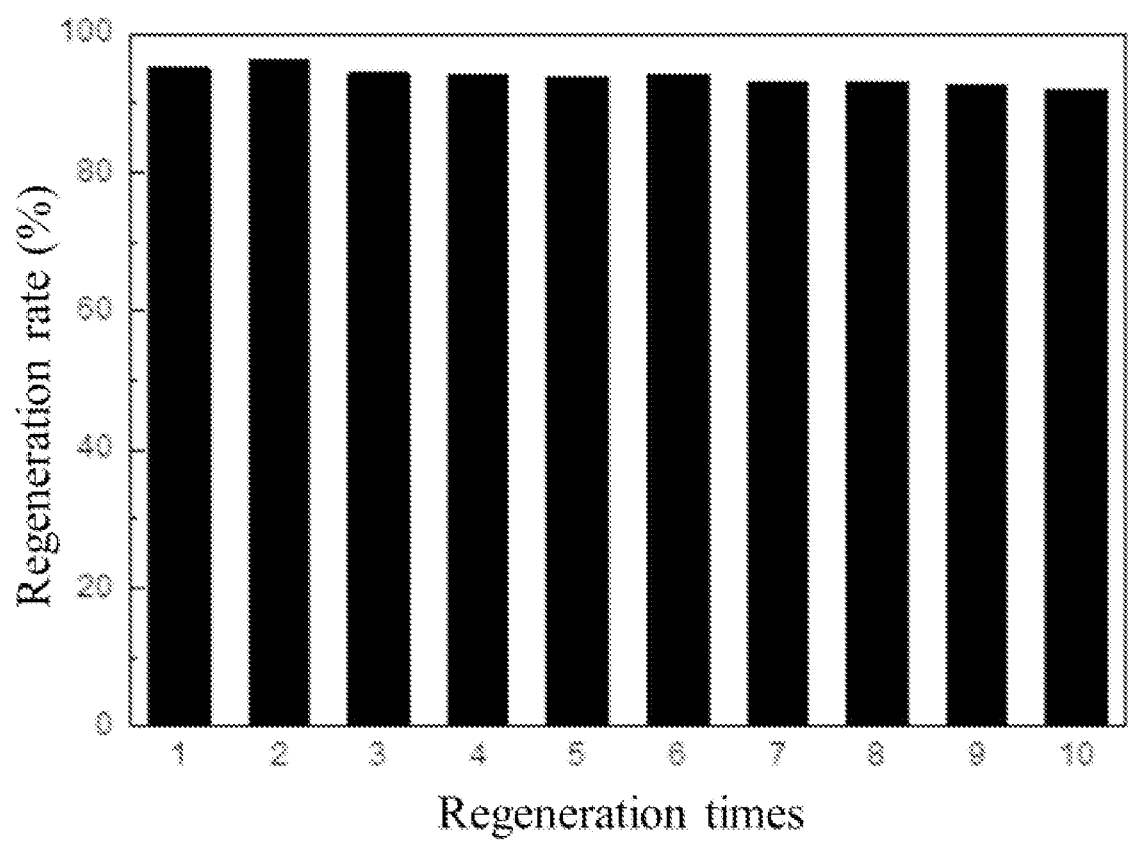
FIG. 3 is a histogram of the repeated regeneration of activated carbon in Example 3 of the present invention.

Example 3 was repeated, and the results of ten repeated regenerations are shown in FIG. 3. The first regeneration rate was as high as 95.1%, and the regeneration rate was still over 90% after ten repetitions.

What is claimed is:
1. A low-temperature plasma regeneration system for inactivated activated carbon, comprising: a gas supply system, a plasma reaction apparatus (1), and a waste gas treatment apparatus (13), wherein the gas supply system is configured for supplying a reaction gas and water vapor; the plasma reaction apparatus comprises a top electrode (2), a grounded lower electrode (4), a regeneration reactor (3) arranged between the electrodes, and a high-voltage alternating current power supply (5) connected with the top electrode; the regeneration reactor (3) is equipped with multiple evenly distributed exhaust ports (16) arranged radially around a circumference of the regeneration reactor (3); the reaction gas enters vertically through an inlet (15) at the center of the electrode, and spreads uniformly outward filling the entire regeneration reactor (3); an exhaust gas is discharged through the exhaust ports (16); and the regeneration reactor (3) is equipped with stirrers (17) made of tetrafluoroethylene, which are connected to a power motor (7) via a transmission shaft (18) for rotation to ensure uniform material mixing.
2. The low-temperature plasma regeneration system for inactivated activated carbon according to claim 1, wherein the gas supply system comprises a water vapor generator (9) and a gas source (11) both connected to a gas mixer (10) by a pipeline, and an outlet of the gas mixer is connected with the inlet of the regeneration reactor.
3. The low-temperature plasma regeneration system for inactivated activated carbon according to claim 2, wherein the gas source (11) supplies oxygen and an inert gas.
4. The low-temperature plasma regeneration system for inactivated activated carbon according to claim 2, wherein an outside of the gas mixer (10) and an outside of a water vapor path pipeline are laid with thermal insulation materials.
5. The low-temperature plasma regeneration system for inactivated activated carbon according to claim 1, wherein the high-voltage alternating current power supply is connected with a digital storage oscilloscope (6), probes of the oscilloscope are connected with a power supply high-voltage output voltage interface and a power supply high- voltage output current interface, respectively, current value and voltage value thereof are measured, and discharge power is calculated by using a Lissajous figure.

6. The low-temperature plasma regeneration system for inactivated activated carbon according to claim 1, wherein the top electrode (2) and the lower electrode (4) are provided with a height adjusting mechanism, and the regeneration reactor (3) is locked by adjusting a height thereof.

7. The low-temperature plasma regeneration system for inactivated activated carbon according to claim 1, wherein at least two stirrers (17) are provided, and are driven to rotate by the power motor (7).

8. The low-temperature plasma regeneration system for inactivated activated carbon according to claim 1, wherein the waste gas treatment apparatus (13) is provided with a 5-10% potassium iodide solution as an absorption liquid.

9. A low-temperature plasma regeneration method for inactivated activated carbon based on the regeneration apparatus of claim 1, comprising:
   (1) putting an inactivated activated carbon into the regeneration reactor, putting the regeneration reactor between the top electrode and the lower electrode of the plasma reaction apparatus, and adjusting the top electrode and the lower electrode to lock the regeneration reactor;
   (2) opening the gas supply system to introduce an inert gas, turning on the high-voltage alternating current power supply to adjust peak voltage and frequency, then observing a stable and continuous Lissajous figure displayed on a display screen of a digital storage oscilloscope, and maintaining the peak voltage and frequency for a certain time;
   (3) opening a water vapor generator and the gas supply system to introduce the water vapor, oxygen and the inert gas, fully mixing the oxygen and the inert gas in a gas mixer to obtain a mixed gas, then introducing the mixed gas into the regeneration reactor to participate in an oxidation reaction, adjusting the peak voltage and frequency of the power supply to obtain a stable discharge state, and keeping reaction parameters unchanged;
   (4) turning off the high-voltage alternating current power supply to suspend the plasma regeneration reaction, turning on the power motor to drive the stirrers to rotate for material mixing, and re-exciting plasma after a bottom-layer activated carbon is exposed on a surface to perform the oxidation reaction; and
   (5) taking out activated carbon and drying to obtain a regenerated activated carbon after cooling the regeneration reactor to room temperature.

10. The low-temperature plasma regeneration method for inactivated activated carbon according to claim 9, wherein, in the step (3), an amount of the water vapor accounts for 1-10% of a mass of the inactivated activated carbon, and a content of the oxygen in the mixed gas is 5-50%.

* * * * *